March 24, 1931.  S. A. WILDE  1,797,308
SHUTTER
Filed Oct. 14, 1929
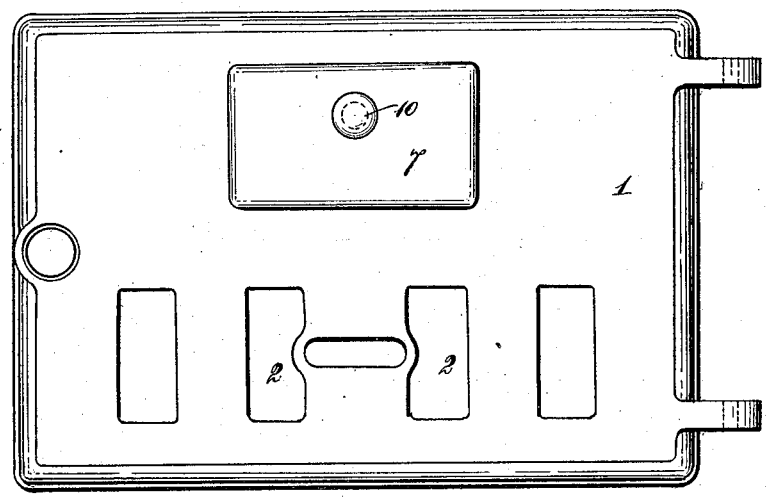
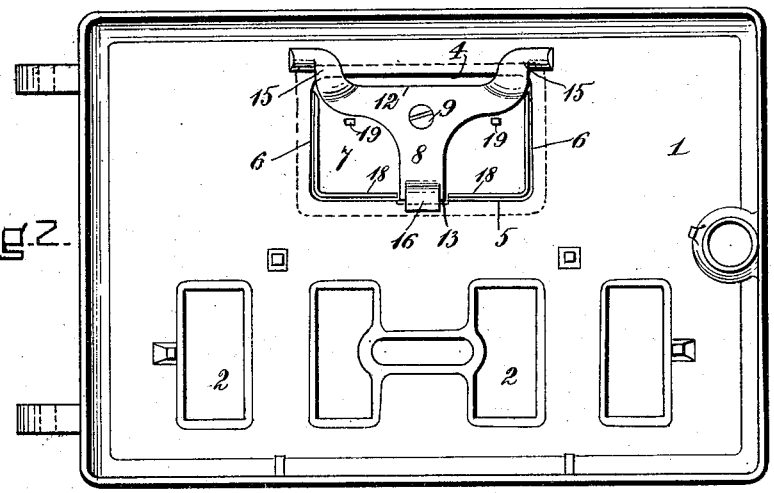
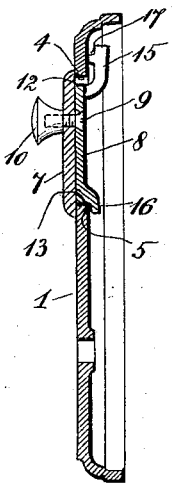
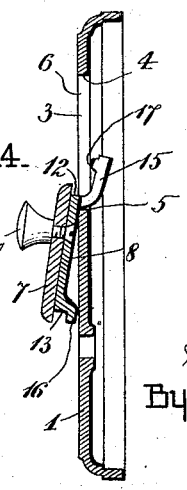
INVENTOR:
Samuel A. Wilde
By John E. R. Hayes
ATTORNEY:

Patented Mar. 24, 1931

1,797,308

UNITED STATES PATENT OFFICE

SAMUEL A. WILDE, OF TAUNTON, MASSACHUSETTS, ASSIGNOR TO GLENWOOD RANGE COMPANY, OF TAUNTON, MASSACHUSETTS, A CORPORATION OF MASSACHUSETTS

SHUTTER

Application filed October 14, 1929. Serial No. 399,430.

The invention relates to an improvement in shutters and especially those used to cover openings in stoves.

The object of the invention is to provide an attractive, tight-closing shutter; one that will bear when closed against the exterior surface of the body on which the shutter is hung, and one in which the means for its retention is entirely concealed when the shutter is closed; to provide, also, a means of retention which will permit of an easy opening and closure of the shutter without marring the exterior surface of the body on which the shutter is hung. A further object is to provide a gravity-controlled shutter, which may be opened and closed by a combined sliding and turning movement without removal of the shutter or disarrangement of any of its operating parts.

The shutter is especially adapted for closing the opening in an ashpit door through which access is had to the shakers for operating them on opening the shutter when the ashpit door itself is closed. The shutter is accordingly shown in the drawings in connection with an ashpit door.

Referring to the drawings:—

Figure 1 is a plan of the exterior of the ashpit door with shutter closed.

Fig. 2 is a plan of the interior of the ashpit door with shutter closed.

Figs. 3 and 4 are sections of the door, Fig. 3 showing the door with the shutter in a closed position; and Fig. 4 the same as Fig. 3 but with the shutter in an open position.

Referring to the drawings:—

1 represents the ashpit door of common hinged mounting, and having in it the usual draft openings 2 controlled by a slide damper (not shown). Above the draft openings 2 in the door is a shaker opening 3 through which access is had to the grate shaker (not shown) when the door itself is closed.

The shaker opening 3 is one preferably rectangular in form, the edges 4, 5, and 6, 6, forming respectively the top, bottom and side edges framing this opening. Fitting over the opening 3 is a shutter 7. This shutter comprises a flat plate generally rectangular in form and larger than the opening 3 controlled by it, so that when the shutter is in a closed position it will overlap the edges framing the opening 3 with bearing against the outer face of the ashpit door. The shutter has preferably the same finish as that of the ashpit door, and the edges of the shutter are preferably rounded or otherwise finished to give to the shutter an attractive appearance.

Attached to the shutter 7 on the interior thereof so as to lie contained within the opening 3 when the shutter is in a closed position is an attaching plate 8. This plate is preferably generally T-shaped in form. It is attached to the shutter by means of a screw 9 which extends through and beyond the outer face of the shutter where it bears a knob 10 by which the shutter may be moved for opening and closing it as will presently be explained. The plate 8 is so proportioned with relation to the opening 3 that with the shutter closed and the plate contained within the opening 3, the plate will present a top edge 12 appreciably removed or spaced from the top edge 4 of the opening 3 when the bottom edge 13 of the plate is resting on the edge 5 at the bottom of the opening. In other words, the form of the attaching plate 8 is such that the shutter when in a closed position, may be lifted vertically in an appreciable amount. The plate 8 bears side arms 15, 15 and a bottom arm 16. Of these arms the bottom arm 16 extends inwardly away from the lower end of the plate 8 and is bent to have a slight downward extension below the bottom edge 13 of this plate. When the shutter is closed with the bottom edge 13 of the plate 8 resting upon the bottom edge 5 of the opening 3, the arm 16 will have extension to lie in back of the edge 5 and co-operate with the bottom edge of the shutter lying outside the edge 5 to hold the lower portion of the shutter in proper closed position snugly contacting with the outside surface of the ashpit door as shown in Fig. 3. The arms 15, 15, project from the opposite sides of the plate 8 at the top of the plate. These arms are so bent as to project inwardly from the plate 8 and thence turn to extend upwardly beyond the top edge 12 of the plate 8 so as to overlap the top edge 4 of the opening 3 and are thence laterally turned to extend outwardly beyond the plane of the side edges 6, 6, of this opening to have bearing by contacts 17 with the inside face of the ashpit door. Thus arranged and extended, the arms 15, 15 co-operate with the arm 16 to hold the shutter in proper closed position but permitting of its opening on lifting the shutter by the knob attached to it. On lifting the shutter until its top edge 12 contacts with the top edge 4 of the opening 3, the bent arm 16 at the bottom of the plate 8 will be lifted to just clear the bottom edge 5 of the opening 3 and this permits of the bottom end portion of the shutter being moved outwardly beyond the bottom edge 5 of the opening 3, and thereupon the shutter will drop by gravity until its arms 12, 12 contact with the bottom edge 11 of the opening 3 as shown in Fig. 4 when the shutter will be practically full open permitting access to the grate shaker for operating it. During the drop of the shutter its side arms 15, 15 will slide down over the inside face of the ashpit door adjacent the side edges 6, 6 of the openings 3 in it and will retain their extension beyond these edges by which the shutter will be held attached to the door when the shutter is open. The shutter is closed by simply a reverse movement, the shutter first being raised and then the lower end thereof moved inwardly so that its arm 16 will lock in back of the bottom edge 5 of the opening 3 as the shutter is allowed to drop.

During the opening and closure of the shutter its movement will be in a position outside of contact with the face of the ashpit door so as not to mar the surface of the door if it be an enamelled surface.

For assisting in positioning the shutter with relation to the opening 3 the shutter may be provided on its interior with a flange-forming head 18 which fits just within the side and bottom edges to the opening 3 when the shutter is closed. For assisting in positioning the attaching plate 8 and maintaining it in position, the shutter may be provided on its interior with lugs 19 against which the attaching plate has bearing.

In applying the shutter to the door the shutter is first locked in a closed position over the opening 3 and the plate 8 with attaching arms then fastened to it through the attaching screw 9; afterward the knob 10 is applied to the end of the screw.

Having thus fully described my invention, I claim and desire to secure by Letters Patent of the United States:—

1. The combination with a body having an opening in it, of a movable shutter closing said opening with bearing when closed against the outer face of the body, and means for controlling said shutter whereby it may be lifted when in closed position and afterward angularly turned and lowered into an open position and maintained in such open position.

2. The combination with a body having an opening in it of a movable shutter closing said opening with bearing when closed against the outer face of the body, and means for controlling said shutter including arms connected thereto and with extension to engage the inner face of said body back of certain of the edges framing said opening therein when the shutter is in a closed position, said arms being connected to the shutter and arranged whereby the shutter may be moved slidably when in a closed position and certain of said arms released from engagement with the body as aforesaid whereupon the shutter may be turned angularly and moved in an open position and maintained in such open position.

3. The combination with a body having an opening in it of a movable shutter closing said opening with bearing when closed against the outer face of said body, a fixture attached to the shutter and located within said opening with bearing against the edge framing the bottom of the opening when the shutter is in closed position, said fixture being smaller than said opening whereby the shutter may be slidably raised in a determinate amount when in closed position, and bottom and side arms borne by said fixture with extension to engage the inner face of said body back of the side and bottom edges thereof framing said opening when the shutter is in closed position, said arms being arranged also whereby the bottom one of said arms may be released from its engagement with the body as aforesaid when the shutter is slidably lifted in the determinate amount permitted by said fixture whereupon the shutter may be turned angularly and moved into an open position and maintained in such open position.

4. The combination with a body having an opening in it, of a movable shutter closing said opening with bearing when closed against the outer face of said body, interior side arms and a bottom arm connected to said shutter with extension to overlap said body on its inner side adjacent said opening, said arms being so co-ordinated and arranged with relation to said opening that the shutter may be lifted when in a closed position and afterward angularly turned releasing the bottom one of said arms to a position outside said opening whereby the shutter may be lowered to an open position and maintained in such position by the continued engagement of the side arms with said body.

SAMUEL A. WILDE.